US008359040B2

(12) United States Patent
Usuda et al.

(10) Patent No.: US 8,359,040 B2
(45) Date of Patent: *Jan. 22, 2013

(54) TRANSMISSION RATE CONTROL METHOD, MOBILE STATION, RADIO BASE STATION, AND WIRELESS LINE CONTROL STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 758 days.

This patent is subject to a terminal disclaimer.

(21) Appl. No.: 11/794,611

(22) PCT Filed: Jan. 5, 2006

(86) PCT No.: PCT/JP2006/300038
§ 371 (c)(1),
(2), (4) Date: Jul. 3, 2007

(87) PCT Pub. No.: WO2006/073158
PCT Pub. Date: Jul. 13, 2006

(65) Prior Publication Data
US 2008/0125134 A1 May 29, 2008

(30) Foreign Application Priority Data
Jan. 5, 2005 (JP) .................................. 2005-001029

(51) Int. Cl.
*H04W 72/00* (2009.01)
(52) U.S. Cl. .................. 455/452.1; 455/422.1; 455/450; 370/328; 370/329
(58) Field of Classification Search .......... 370/328–339, 370/431, 340–347, 310, 441, 442, 489, 496, 370/498, 522, 505–507; 455/68, 69, 450, 455/452.1, 453, 403, 422.1, 455, 39, 500–507
See application file for complete search history.

(56) References Cited

U.S. PATENT DOCUMENTS

| | | | |
|---|---|---|---|
| 2003/0063583 A1* | 4/2003 | Padovani et al. | 370/329 |
| 2003/0142656 A1* | 7/2003 | Padovani et al. | 370/347 |

(Continued)

FOREIGN PATENT DOCUMENTS

EP 1 655 909 A1 5/2006

OTHER PUBLICATIONS

3GPP TSG-RAN Working Group 1 # Release-6 AdHoc Meeting TSGR1(04)0773, Cannes, France, Jun. 21-24, 2004, Source: NTT DoCoMo; Title: Cell level rate control and Autonomous transmission with rate ramping; Agenda item: 5, 6.3; Document for: Discussion.

(Continued)

*Primary Examiner* — Chuong A Ngo
(74) *Attorney, Agent, or Firm* — Marvin A. Motsenbocker; Mots Law, PLLC (57) ABSTRACT

The present invention relates to a transmission rate control method of controlling a transmission rate of user data transmitted from a mobile station via an uplink. When a serving cell performing a scheduling control in the uplink of the mobile station transmits, to mobile station, an absolute rate grant channel for designating the maximum allowable transmission rate common in the serving cell, and when the mobile station is configured to determine the transmission rate of the user data based on the absolute rate grant channel, a non-serving cell other than the serving cell does not transmit a relative rate grant channel for adjusting the maximum allowable transmission rate.

3 Claims, 9 Drawing Sheets

U.S. PATENT DOCUMENTS

| | | | |
|---|---|---|---|
| 2004/0179525 A1* | 9/2004 | Balasubramanian et al. | 370/391 |
| 2005/0030964 A1* | 2/2005 | Tiedemann et al. | 370/431 |
| 2005/0220052 A1* | 10/2005 | Uehara et al. | 370/331 |
| 2005/0249133 A1* | 11/2005 | Terry et al. | 370/278 |
| 2006/0056355 A1* | 3/2006 | Love et al. | 370/332 |
| 2006/0104240 A1* | 5/2006 | Sebire et al. | 370/329 |
| 2006/0223445 A1* | 10/2006 | Baker et al. | 455/69 |
| 2010/0014423 A1* | 1/2010 | Furuskar et al. | 370/235 |

OTHER PUBLICATIONS

3GPP TS 25.309 v6.1.0 (Dec. 2004); $3^{rd}$ Generation Partnership Project; Technical Specification Group Radio Access Network; FDD Enhanced Uplink; Overall description; Stage 2 (Release 6); p. 1-26.

3GPP TS 25.309 v6.0.0 (Sep. 2004); $3^{rd}$ Generation Partnership Project; Technical Specification Group Radio Access Network; FDD Enhanced Uplink; Overall description; Stage 2 (Release 6); p. 1-12.

* cited by examiner

TRANSMISSION RATE CONTROL METHOD, MOBILE STATION, RADIO BASE STATION, AND WIRELESS LINE CONTROL STATION

TECHNICAL FIELD

The present invention relates to a transmission rate control method, a mobile station, a radio base station and a radio network controller which control a transmission rate of user data to be transmitted from a mobile station via an uplink.

BACKGROUND ART

In a conventional mobile communication system, a radio network controller RNC is configured to determine a transmission rate of a dedicated channel while taking into consideration radio resources of a radio base station Node-B, the amount of uplink interference, a transmission power of a mobile station UE, a transmission processing performance of the mobile station UE, a transmission rate required by an upper application or the like; and then to notify the determined transmission rate of the dedicated channel to each of the mobile station UE and the radio base station Node-B through a layer 3 (Radio Resource Control Layer) massage.

Here, the radio network controller RNC is a device that exists at a higher level than the radio base station Node-B, and that controls the radio base station Node-B and the mobile station UE.

In general, data communications often cause burst traffic compared to voice communications or telecommunications. For this reason, it is desirable that the transmission rate of a channel used for data communications be changed rapidly.

Figure 1:
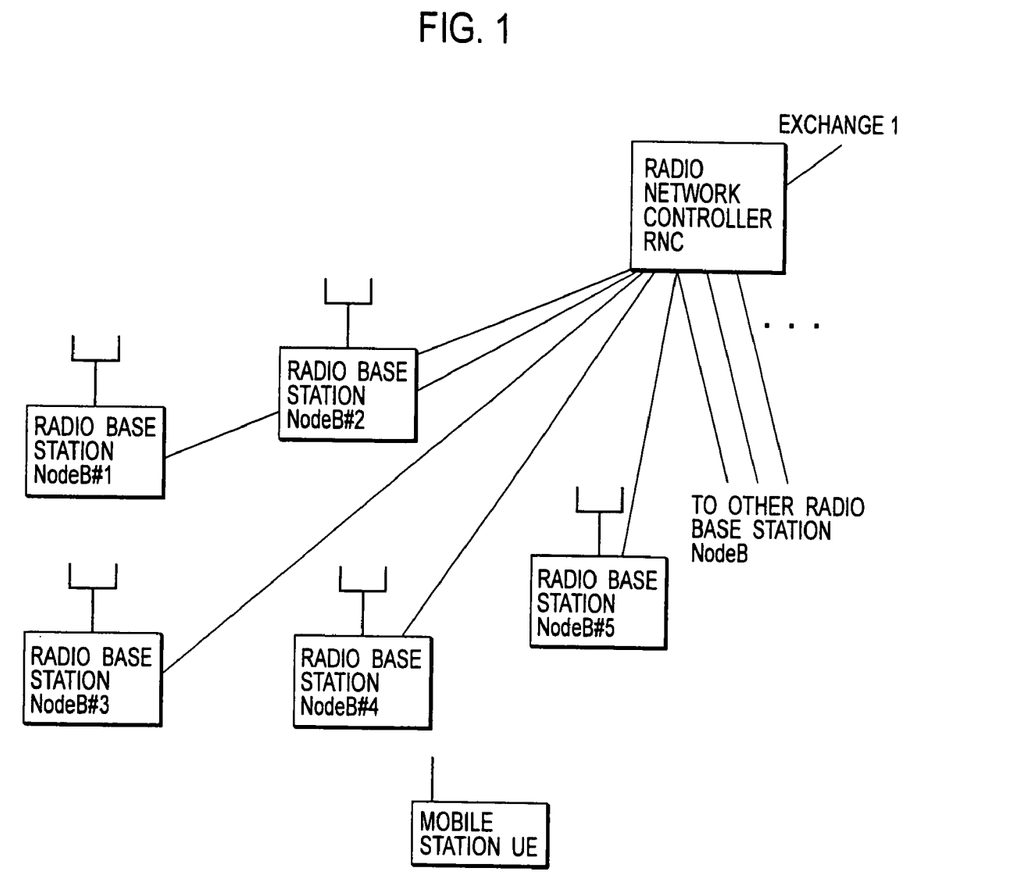
FIG. 1 is a diagram showing an overall configuration of a general mobile communication system.

However, as shown in FIG. 1, the radio network controller RNC integrally controls multiple radio base stations Node-B. Accordingly, there is a problem that the conventional mobile communication system has difficulty in performing a control for changing a transmission rate of a channel rapidly (for example, approximately 1 to 100 ms), due to processing load, processing delay, or the like.

In the conventional radio network controller RNC, there is also a problem that costs for implementing an apparatus and operating a network are substantially increased even if the control for changing a transmission rate of a channel rapidly can be performed.

Accordingly, in the conventional mobile communication system, a transmission rate of a channel is usually controlled and changed on the order of a few hundred milliseconds to a few seconds.

Consequently, in the conventional mobile communication system, when burst data transmissions are performed as shown in FIG. 2(a), the data are to be transmitted by allowing low speed, high delay, and low-transmission efficiency as shown in FIG. 2(b), or, as shown in FIG. 2(c), by reserving radio resources for high speed communications and by allowing the wasting of radio band resources in an unoccupied state and hardware resources in the radio base station Node-B.

Figure 2:
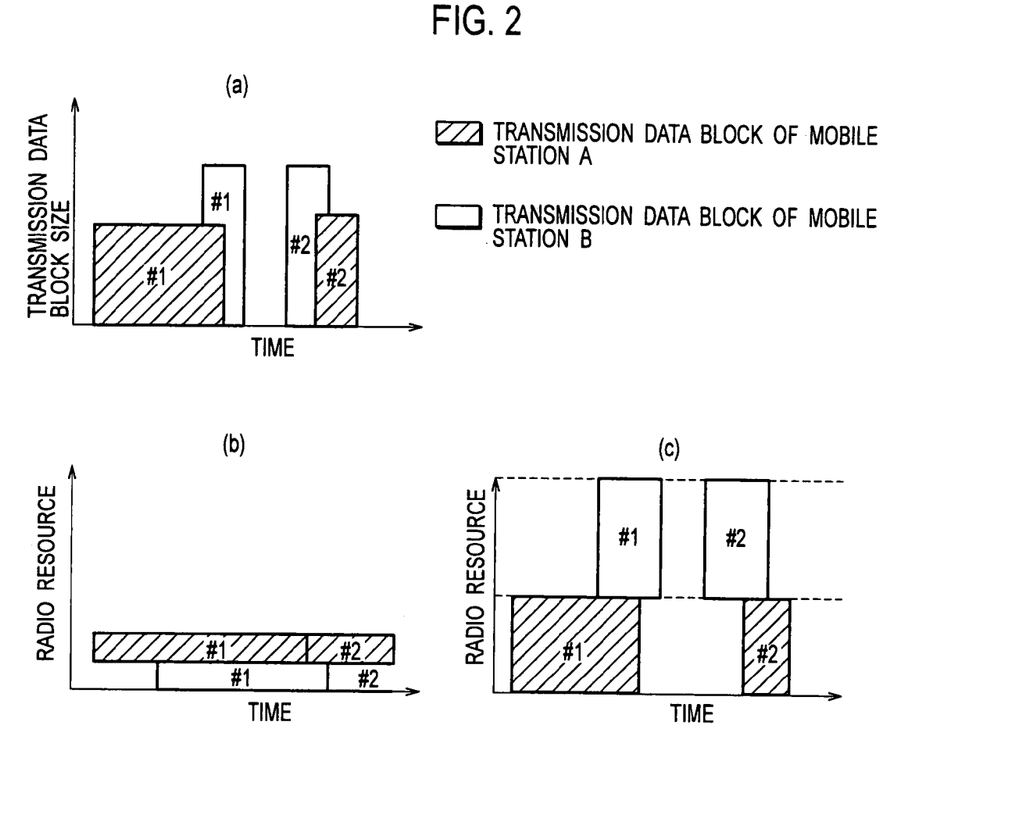
FIGS. 2(a) to 2(c) are diagrams for describing an operation of transmitting data in burst mode, in a conventional mobile communication system.

Note that it is assumed that the radio resources in the vertical axis in FIG. 2 includes both of the above-described radio band resources and hardware resources.

Then, the "3GPP" and the "3GPP2", which are international standardization groups of the third generation mobile communication system, have discussed a method for controlling high-speed radio resources of a layer 1, and a media access control (MAC) sub-layer (a second layer) between a radio base station Node-B and a mobile station UE, so as to utilize the radio resources effectively. Such discussions or discussed functions will be hereinafter collectively referred to as the "Enhanced Uplink (EUL)".

The radio resource control methods that have heretofore been examined within the "Enhanced Uplink" are roughly classified into the following three categories. Hereinafter, an overview will be given of such radio resource control methods.

First, there has been examined a radio resource control method called "Time & Rate Control".

In such a radio resource control method, a radio base station Node-B determines, at each predetermined timing, which mobile station UE to be allowed to transmit user data and the transmission rate of user data, and informs the mobile station UE of information related to the transmission rate of user data (or the maximum allowable transmission rate of user data) along with the mobile station ID.

Then, the mobile station UE specified by the radio base station Node-B transmits user data at the specified timing and the transmission rate (or within a range of the maximum allowable transmission rate).

Second, there has been examined a radio resource control method called "Rate Control per UE".

In such a radio resource control method, whenever a mobile station has user data to be transmitted to a radio base station Node-B, the mobile station is allowed to transmit the user data. As to the maximum allowable transmission rate of the user data, however, the mobile station UE uses one which is determined by the radio base station Node-B for each transmission frame or each plurality of transmission frames, and which is then notified to the mobile station UE.

Here, when providing a notification of the maximum allowable transmission rate, the radio base station Node-B provides a notification of the maximum allowable transmission rate itself at the timing, or a relative value of the maximum allowable transmission rate (for example, a binary value of Up/Down).

Thirdly, there has been examined a radio resource control method called "Rate Control per Cell".

In such a radio resource control method, a radio base station Node-B broadcasts a transmission rate of user data common to mobile stations UE in communications, or information required for calculating the transmission rate, and each of the mobile stations determines a transmission of user data based on the received information.

Ideally, the "Time & Rate Control" and the "Rate Control per UE" can be the best control methods for improving uplink radio capacity. However, since the radio base station Node-B is required to assign a transmission rate of user data by recognizing the amount of data accumulated in a buffer of the mobile station UE or a transmission power of the mobile station UE, or the like, in these methods, there is a problem that a control load on the radio base station Node-B increases.

In addition, these radio resource control methods have another problem that the overhead caused by exchanging control signals increases.

On the other hand, the "Rate Control per Cell" has an advantage that a control load by a radio base station Node-B is small, since the radio base station Node-B broadcasts information common to cells, and each mobile station UE autonomously finds a transmission rate of user data based on the received information.

However, since the radio base station Node-B needs to be configured to be capable of receiving uplink user data transmitted from any mobile station UE, there is a problem that the device scale of the radio base station Node-B has to increase in order to effectively utilize uplink radio capacity.

With this regard, a method (Autonomous ramping method), for example, is proposed as described in the Non-Patent Document 1. In this method, a mobile station UE increases, in accordance with a predetermined rule, a transmission rate of user data from an initial transmission rate provided in advance, and the radio station Node-B is accordingly prevented from excessively allocating a radio capacity. This also prevents an increase of the device scale of the radio base station Node-B.

In this method, a radio base station determines the maximum allowable transmission rate (or a parameter related to the maximum allowable transmission rate) based on hardware resources or radio resources (for example, the amount of interference in uplink) in each sector, and controls the user transmission rate of a mobile station in communications. Hereinafter, descriptions will be specifically given of a control method based on hardware resources and a control method based on the amount of interference in uplink.

In the control method based on hardware resources, the radio base station is configured to broadcast the maximum allowable transmission rate (or a parameter related to the maximum allowable transmission rate) to mobile stations connected to sectors under the radio base station.

In a case where hardware resources are about to run out because a transmission rate of user data in a mobile station connected to the sector under the radio base station increases, the radio base station sets the maximum allowable transmission rate (or a parameter related to the maximum allowable transmission rate) lower to prevent an occurrence of a lack of hardware resources.

On the other hand, in a case where there are some extra hardware resources because the transmission of user data by a mobile station connected to the sector under the radio base station ends or the like, the radio base station sets the maximum allowable transmission rate (or a parameter related to the maximum allowable transmission rate) higher again.

Furthermore, in the control method based on the amount of interference in uplink, a radio base station is configured to broadcast the maximum allowable transmission rate (or a parameter related to the maximum allowable transmission rate) to a mobile station connected to the sector under the radio base station.

Figure 3:
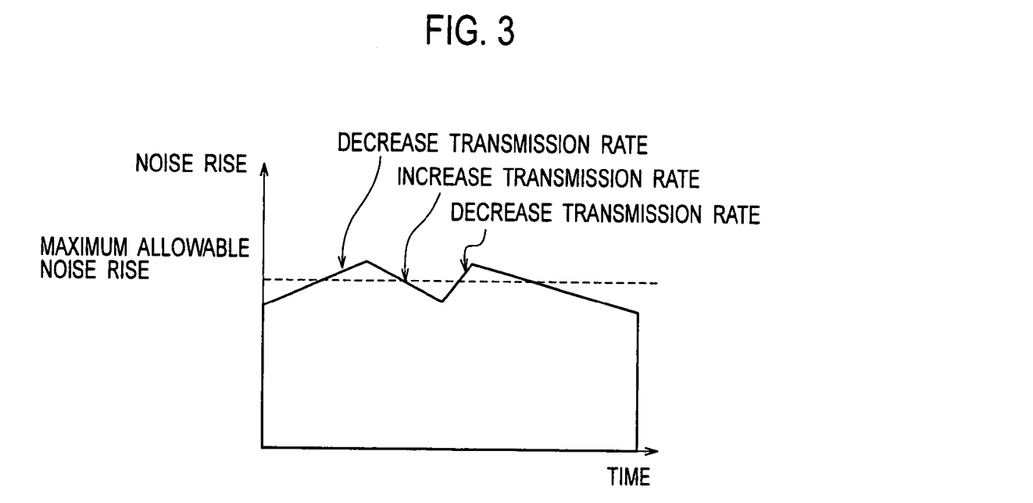
FIG. 3 is a diagram for describing an operation of controlling a transmission rate in an uplink, in the conventional mobile communication system.

In a case where the transmission rate of user data of the mobile station connected to the sector under the radio base station increases, and where the amount of interference in uplink (for example, a noise rise) exceeds the allowable value (for example, the maximum allowable noise rise), the radio base station sets the maximum allowable transmission rate lower, and keeps the amount of interference in uplink within the allowable value (refer to FIG. 3).

On the other hand, in a case where the amount of interference (for example, a noise rise) in uplink is kept within the allowable value (for example, the maximum allowable noise rise) with some margin because the transmission of user data of the mobile station connected to the sector under the radio base station ends or the like, the radio base station again sets the maximum allowable transmission rate (or a parameter related to the maximum allowable transmission rate) higher (refer to FIG. 3).

Note that in general, a serving cell, which performs a scheduling control in uplink of each of mobile stations, is configured to transmit an absolute rate grant channel (AGCH: Absolute Grant Channel) for notifying the maximum allowable transmission rate to each of the mobile stations, and a non-serving cell other than the serving cell is configured to transmit a relative rate grant channel (RGCH: Relative Grant Channel) for adjusting the maximum allowable transmission rate (or a parameter related to the maximum allowable transmission rate) to each of the mobile stations.

Here, specifically, in a case where the non-serving cell determines that the amount of interference from a different cell is large, the non-serving cell transmits a "Down" instruction in the relative rate grant channel (RGCH); otherwise, the non-serving cell transmits a "Don't care" instruction in the relative rate grant channel (RGCH).

Note that as shown in the Non-Patent Document 2, a serving cell is configured not to transmit a relative rate grant channel (RGCH) in the method (Autonomous ramping method) in which a mobile station is configured to automatically increase the transmission rate of user data up to the maximum allowable transmission rate.

In the conventional Autonomous ramping method, however, a user transmission rate in a mobile station temporarily decreases in a case where a "Down" instruction is transmitted from a non-serving cell to the mobile station, but increases immediately after the decrease of the user transmission rate. Accordingly, there is a problem that a relative rate grant channel (RGCH) transmitted from the non-serving cell does not effectively operate. This further produces another problem that a relative rate grant channel (RGCH) merely consumes the radio capacity in the downlink.

[Non-Patent Document 1] 3GPP TSG-RAN R1-040773
[Non-Patent Document 2] 3GPP TS25.309 v6.0.0 (RP-040486)

DISCLOSURE OF THE INVENTION

With this respect, the present invention has been made with the foregoing points taken into consideration. An object of the present invention is to provide a transmission rate control method, a mobile station, a radio base station and a radio network controller that make it possible to increase a radio capacity by saving radio resources in a downlink in a mobile communication system using the Autonomous ramping method.

A first aspect of the present invention is summarized as a transmission rate control method of controlling a transmission rate of user data transmitted from a mobile station via an uplink, wherein a serving cell performing a scheduling control in the uplink of the mobile station transmits, to the mobile station, an absolute rate grant channel for designating a maximum allowable transmission rate, and a non-serving cell other than the serving cell does not transmit, to the mobile station, a relative rate grant channel for adjusting the maximum allowable transmission rate, when the mobile station is configured to automatically increase the transmission rate of the user data up to the maximum allowable transmission rate.

A second aspect of the present invention is summarized as a mobile station configured to control a transmission rate of user data to be transmitted via an uplink, wherein the mobile station is configured to receive an absolute rate grant channel transmitted from a serving cell performing a scheduling control in the uplink of the mobile station, and not to receive a relative rate grant channel transmitted from a non-serving cell other than the serving cell, when the mobile station is configured to automatically increase the transmission rate of the user data up to the maximum allowable transmission rate; the absolute rate grant channel is a channel for designating the maximum allowable transmission rate; and the relative rate grant channel is a channel for adjusting the maximum transmission rate.

A third aspect of the present invention is summarized as a radio base station capable of communicating with a mobile station configured to control a transmission rate of user data to be transmitted via an uplink, wherein the radio base station is configured not to transmit a relative rate grant channel for adjusting the maximum allowable transmission rate, when the mobile station is configured to automatically increase the transmission rate of the user data up to the maximum allowable transmission rate, and when the radio base station does not perform a scheduling control in the uplink of the mobile station.

A fourth aspect of the present invention is summarized as a radio network controller configured to control a transmission rate of user data to be transmitted via an uplink from a mobile station, wherein the radio network controller is configured to make a serving cell performing a scheduling control in the uplink of the mobile station to transmit an absolute rate grant channel for designating the maximum allowable transmission rate to the mobile station, and to make a non-serving cell other than the serving cell not to transmit a relative rate grant channel for adjusting the maximum allowable transmission rate, when the mobile station is configured to automatically increase the transmission rate of the user data up to the maximum allowable transmission rate.

A fifth aspect of the present invention is summarized as a transmission rate control method of controlling a transmission rate of user data to be transmitted from a mobile station via an uplink, wherein, when a serving cell performing a scheduling control in the uplink of the mobile station transmits, to mobile station, an absolute rate grant channel for designating the maximum allowable transmission rate common in the serving cell, and when the mobile station is configured to determine the transmission rate of the user data based on the absolute rate grant channel, a non-serving cell other than the serving cell does not transmit a relative rate grant channel for adjusting the maximum allowable transmission rate.

A sixth aspect of the present invention is summarized as a mobile station configured to control a transmission rate of user data to be transmitted via an uplink, wherein, when a serving cell performing a scheduling control in the uplink of the mobile station transmits, to mobile station, an absolute rate grant channel for designating the maximum allowable transmission rate common in the serving cell, and when the mobile station is configured to determine the transmission rate of the user data based on the absolute rate grant channel, the mobile station is configured not to receive a relative rate grant channel for adjusting the maximum allowable transmission rate, transmitted from a non-serving cell other than the serving cell.

A seventh aspect of the present invention is summarized as a radio base station capable of communicating with a mobile station configured to control a transmission rate of user data to be transmitted via an uplink, wherein, when a serving cell performing a scheduling control in the uplink of the mobile station transmits, to the mobile station, an absolute rate grant channel for designating the maximum allowable transmission rate common in the serving cell, when the mobile station is configured to determine the transmission rate of the user data based on the absolute rate grant channel, and when the radio base station does not perform the scheduling control in the uplink of the mobile station as the serving cell, the radio base station is configured not to transmit, to the mobile station, a relative rate grant channel for adjusting the maximum allowable transmission rate.

A eighth aspect of the present invention is summarized as a radio network controller configured to control a transmission rate of user data to be transmitted from a mobile station via an uplink, wherein, when a serving cell performing a scheduling control in the uplink of the mobile station transmits, to the mobile station, an absolute rate grant channel for designating the maximum allowable transmission rate common in the serving cell, and when the mobile station is configured to determine the transmission rate of the user data based on the absolute rate grant channel, the radio network controller is configured to make a non-serving cell other than the serving cell not to transmit a relative rate grant channel for adjusting the maximum allowable transmission rate.

BEST MODE FOR CARRYING OUT THE INVENTION

Configuration of Mobile Communication System According to First Embodiment of the Present Invention A description will be given of a configuration of a mobile communication system according to a first embodiment of the present invention with reference to FIGS. 4 to 11. Note that the mobile communication system according to this embodiment includes a plurality of radio base stations Node-B #1 to #5 and a radio network controller RNC, as shown in FIG. 1.

The mobile communication system according to the present embodiment is configured to control a transmission rate of user data transmitted from a mobile station via an uplink.

Moreover, in the mobile communication system according to the present embodiment, the "HSDPA" is employed in a downlink, and the "EUL (enhanced uplink)" is employed in an uplink. Note that it is assumed that a re-transmission control (N process stop-and-wait) by the HARQ is performed in both the "HDSPA" and the "EUL".

Accordingly, in the uplink, used are: an enhanced dedicated physical channel (E-DPCH: Enhanced Dedicated Physical Channel) configured of an enhanced dedicated physical data channel (E-DPDCH: Enhanced Dedicated Physical Data Channel) and an enhanced dedicated physical control channel (E-DPCCH: Enhanced Dedicated Physical Control Channel); and a dedicated physical channel (DPCH: Dedicated Physical Channel) configured of a dedicated physical data channel (DPDCH: Dedicated Physical Data Channel) and a dedicated physical control channel (DPCCH: Dedicated Physical Control Channel).

Here, the enhanced dedicated physical control channel (E-DPCCH) transmits control data for the EUL such as a transmission format number for defining a transmission format (such as a transmission block size) of an E-DPDCH, information related to the HARQ (such as the number of re-transmissions) or information related to scheduling (such as a transmission power or the amount of buffer accumulated in a mobile station UE).

Moreover, the enhanced dedicated physical control channel (E-DPDCH) is associated with the enhanced dedicated physical control channel (E-DPCCH), and transmits user data for a mobile station UE, based on the control data for the EUL to be transmitted in the enhanced dedicated physical control channel (E-DPCCH).

The dedicated physical control channel (DPCCH) transmits control data such as a pilot symbol used in the RAKE combining or the SIR measurement, a Transport Format Combination Indicator (TFCI) for identifying the transmission format of the uplink dedicated physical data channel (DPDCH), or a transmission power control bit in the downlink.

Furthermore, the dedicated physical data channel (DPDCH) is associated with the dedicated physical control channel (DPCCH), and transmits user data for a mobile station UE, based on the control data to be transmitted in the dedicated physical control channel (DPCCH). In a case where no user data to be transmitted exists in the mobile station UE, however, it is possible to configure not to transmit a dedicated physical data channel (DPDCH).

Moreover, in an uplink, a high speed dedicated physical control channel (HS-DPCCH: High Speed Dedicated Physical Control Channel) required in a case where the HSPDA is applied and a random access channel (RACH) are used.

The high speed dedicated physical control channel (HS-DPCCH) transmits a downlink CPICH Quality Indicator (CQI) or a transmission acknowledgement signal (Ack or Nack) for the high speed dedicated physical data channel.

Figure 4:
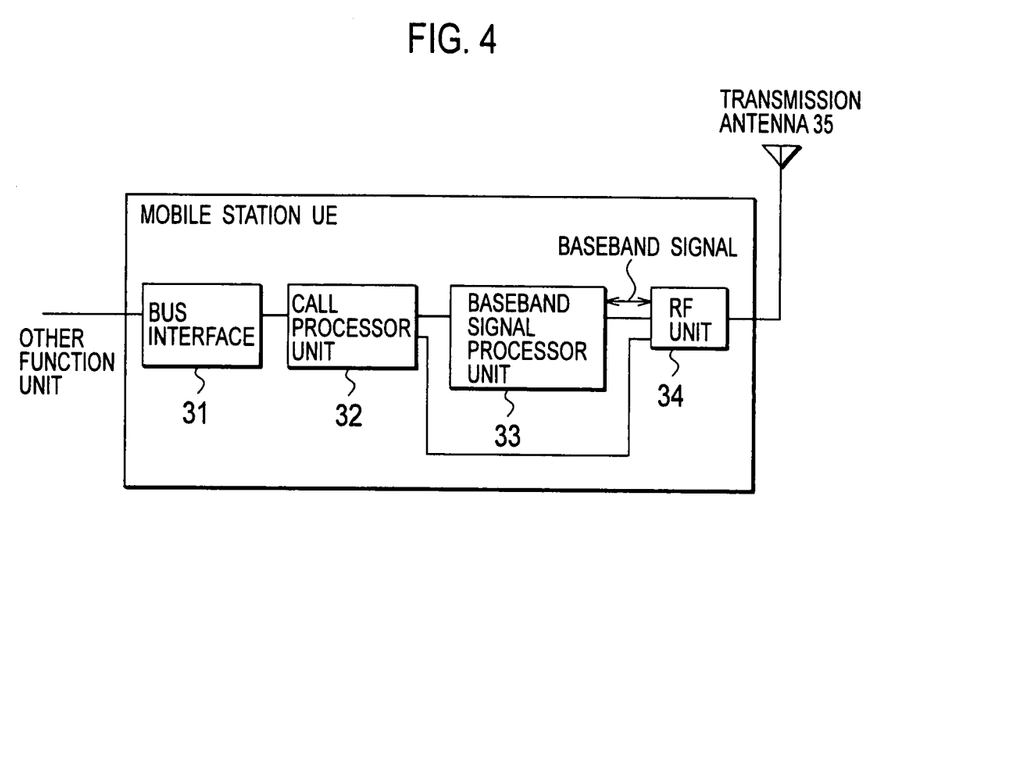
FIG. 4 is a functional block diagram of a mobile station of a mobile communication system according to an embodiment of the present invention.

As shown in FIG. 4, a mobile station UE according to the present embodiment includes a bus interface 31, a call processor unit 32, a baseband processor unit 33, an RF unit 34, and a transmitter-receiver antenna 36.

However, such functions may exist independently as hardware components, or may be partially or entirely integrated into a single piece, or may be configured of processes of software.

The bus interface 31 is configured to forward user data outputted from the call processor unit 32 to a different function unit (for example, a function unit related to an application). In addition, the bus interface 31 is configured to forward user data transmitted from a different function unit (for example, a function unit related to an application) to the call processor unit 32.

The call processor unit 32 is configured to perform a call control process for transmitting and receiving user data.

The baseband signal processor unit 33 is configured to transmit, to the call processor unit 32, user data obtained by performing, on a baseband signal transmitted from the RF unit 34, a Layer 1 process including a despreading process, a RAKE combining process or an FEC decoding process, a MAC process including aMAC-e process or a MAC-d process, and an RLC process.

Moreover, the baseband signal processor unit 33 is configured to create a baseband signal, by performing the RLC process, the MAC process or the Layer 1 process on the user data transmitted from the call processor unit 32, and then to transmit the baseband signal to the RF unit 34.

Note that descriptions of specific functions of the baseband signal processor unit 33 will be provided later. The RF unit 34 is configured to create a baseband signal, by performing a detection process, a filtering process, a quantization process or the like, on a signal of a radio frequency band received via the transmitter-receiver antenna 35, and then to transmit the baseband signal to the baseband signal processor unit 33. Moreover, the RF unit 34 is configured to convert the baseband signal transmitted from the baseband signal processor unit 33 into a radio frequency band signal.

Figure 5:
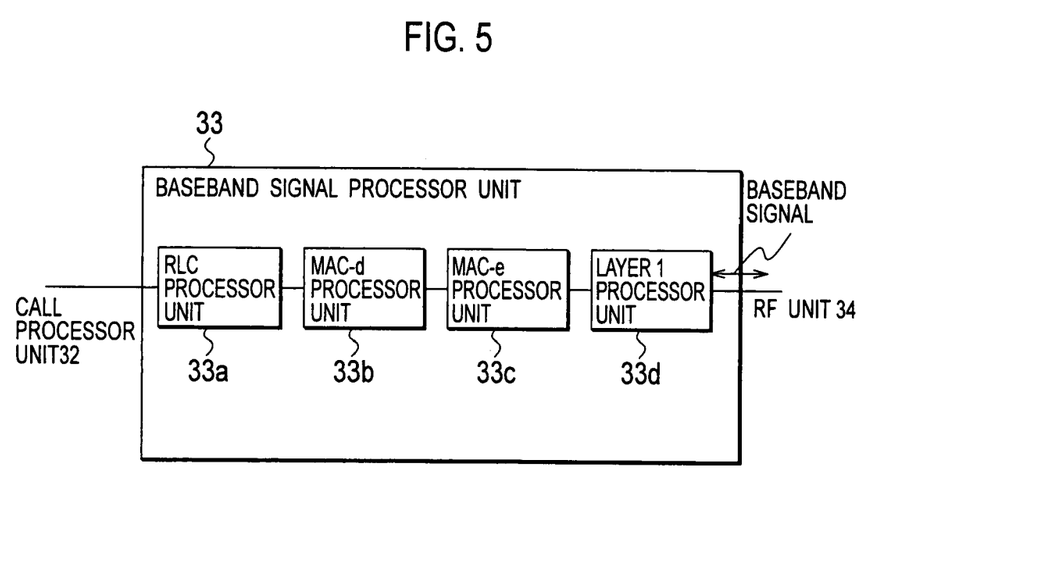
FIG. 5 is a functional block diagram of a baseband signal processor unit in a mobile station of the mobile communication system according to the embodiment of the invention.

As shown in FIG. 5, the baseband signal processor unit 33 includes an RLC processor unit 33a, a MAC-d processor unit 33b, a MAC-e processor unit 33c and a Layer 1 processor unit 33d.

The RLC processor unit 33a is configured to perform a process in an upper layer of the Layer 2, on user data transmitted from the call processor unit 32, and then to transmit the user data to the MAC-d processor unit 33b.

The MAC-d processor unit 33b is configured to provide a channel identifier header, and to create an uplink transmission format based on the limitation of a transmission power in uplink.

As shown in FIG. 6(a), the MAC-e processor unit 33c includes an E-TFC selector unit 33c1 and an HARQ processor unit 33c2.

The E-TFC selector unit 33c1 is configured to determine transmission formats (E-TFC) of an enhanced dedicated physical data channel (E-DPDCH) and an enhanced dedicated physical control channel (E-DPCCH) based on a scheduling signal transmitted from a radio base station Node-B.

Moreover, the E-TFC selector unit 33c1 transmits to the Layer 1 processor unit 33d, transmission format information as to the determined transmission format (a transmission data block size or a transmission power ratio of the enhanced dedicated physical data channel (E-DPDCH) to the enhanced dedicated physical control channel (E-DPCCH)), and also transmits the determined transmission data block size or transmission power ratio to the HARQ processor unit 33c2.

Here, the scheduling signal includes the maximum allowable transmission rate of user data (for example, the maximum allowable transmission data block size, or the maximum value of the transmission power ratio of the enhanced dedicated physical data channel (E-DPDCH) to the enhanced dedicated physical control channel (E-DPCCH)) in the mobile station UE, or a parameter related to the maximum allowable transmission rate.

Such scheduling signal is information that has been broadcasted in the sector in which the mobile station UE is located, and includes control information for all mobile stations located in the sector or a specific group of mobile stations located in the sector.

Here, the E-TFC selector unit $33c1$ is configured to increase the transmission rate of user data in uplink until the transmission rate reaches the maximum allowable transmission rate notified by the scheduling signal from the radio base station Node-B.

The HARQ processor unit $33c2$ is configured to perform a process management of the "N process stop-and-wait", and to transmit user data in uplink based on a transmission acknowledgement signal (Ack/Nack for uplink data) received from the radio base station Node-B.

Specifically, the HARQ processor unit $33c2$ determines, based on a CRC result inputted from the Layer 1 processor unit $33d$, whether or not the receiving process of downlink user data has succeeded. Then, the HARQ processor unit $33c2$ creates a transmission acknowledgement signal (Ack or Nack for downlink user data) based on the result of the determination, and transmits the signal to the Layer 1 processor unit $33d$. Moreover, in a case where the result of the aforementioned determination is OK, the HARQ processor unit $33c2$ transmits the downlink user data inputted from the Layer 1, to the MAC-d processor unit $33d$.

Figure 6:
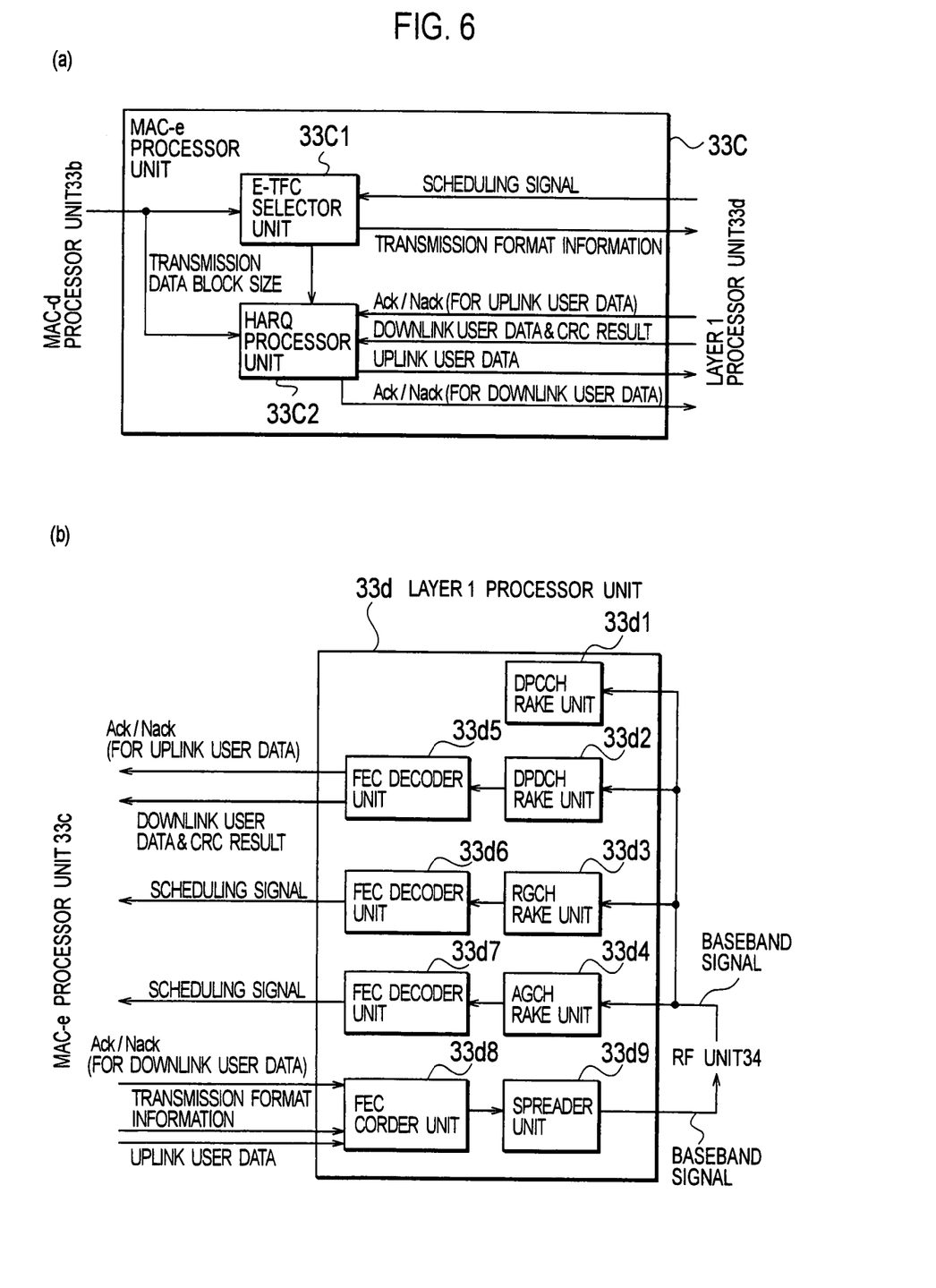
FIG. 6(a) is a functional block diagram of a MAC-e processor unit of the baseband signal processor unit in a mobile station of the mobile communication system according to the embodiment of the invention.
FIG. 6(b) is a functional block diagram of a Layer 1 processor unit in a mobile station of the mobile communication system according to the embodiment of the invention.

As shown in FIG. 6($b$), the Layer 1 processor unit $33d$ mainly includes a DPCCH RAKE unit $33d1$, a DPDCH RAKE unit $33d2$, an RGCH RAKE unit $33d3$, an AGCH RAKE unit $33d4$, FEC decoder units $33d5$, $33d6$ and $33d7$, an FEC coder unit $33d8$, and spreader unit $33d9$.

The DPDCH RAKE unit $33d2$ is configured to perform a despreading process and a RAKE combining process on a dedicated physical data channel DPDCH in the downlink signal transmitted from the RF unit 34, and to output a RAKE combining output to the FEC decoder unit $33d5$.

The FEC decoder unit $33d5$ is configured to perform an FEC decoding process on the DPDCH RAKE combining output from the RAKE unit $33d2$, then to extract downlink user data, and to transmit the downlink user data to the MAC-e processor unit $33c$. Note that the FEC decoder unit $33d5$ may be configured to employ soft combining when performing the FEC decoding process. In addition, the FEC decoder unit $33d5$ is configured to transmit a result of CRC performed on the downlink user data, to the MAC-e processor unit $33c$.

The RGCH RAKE unit $33d3$ is configured to perform a despreading process and a RAKE combining process on the relative rate grant channel (RGCH) in the downlink signal transmitted from the RF unit 34, and to output a RAKE combining output to the FEC decoder unit $33d6$. Specifically, the RGCH RAKE unit $33d3$ is configured to perform a receiving process (despreading process and RAKE combining process) on the relative rate grant channel (RACH) transmitted from a non-serving cell.

Here, the RGCH RAKE unit $33d3$ is configured not to perform the receiving process on the relative rate grant channel (RGCH) transmitted from a non-serving cell, in a case where the Autonomous ramping method is used (specifically, in a case where the mobile station UE is configured to automatically increase the transmission rate of user data up to the maximum allowable transmission rate).

Note that, as described in the Non-Patent Document 2, in a case where the Autonomous ramping method is used, the serving cell that performs a scheduling control in uplink of a mobile station UE transmits an absolute rate grant channel for designating the maximum allowable transmission rate (Secondary Absolute rate grant) common to mobile stations UE in the serving cell. The mobile station UE is configured to determine the transmission rate of user data to be transmitted via the uplink based on the absolute rate grant channel.

Specifically, in a case where the Autonomous ramping method is used, a mobile station UE is configured to determine the transmission rate of user data to be transmitted via the uplink based on an absolute rate grant channel for designating the maximum allowable transmission rate (Secondary Absolute rate grant) common to the serving cell, not based on an absolute rate grant channel for designating the dedicated maximum allowable transmission rate (Primary Absolute rate grant) to each mobile station.

The FEC decoder unit $33d6$ is configured to perform an FEC decoding process on the RAKE combining output of the RGCH RAKE unit $33d3$, then to extract a scheduling signal, and to transmit the signal to the MAC-e processor unit $33c$. Note that the scheduling signal includes the maximum allowable transmission rate (a transmission data block size, or a transmission power ratio of the enhanced dedicated physical data channel (E-DPDCH) to the enhanced dedicated physical control channel (E-DPCCH)) of the uplink, or the like.

The AGCH RAKE unit $33d4$ is configured to perform a despreading process and a RAKE combining process on the absolute rate grant channel (AGCH) in the downlink signal transmitted from the RF unit 34, and to output a RAKE combining output to the FEC decoder unit $33d7$. Specifically, the AGCH RAKE unit $33d4$ is configured to perform a receiving process (a despreading process and a RAKE combining process) on the absolute rate grant channel (AGCH) transmitted from a serving cell.

The FEC coder unit $33d8$ is configured to perform an FEC coding process on the uplink user data transmitted from the MAC-e processor unit $33c$, by use of the transmission format information transmitted from the MAC-e processor unit $33c$, in response to the transmission acknowledgement signal (Ack/Nack for downlink data) transmitted from the MAC-e processor unit $33c$, and to transmit the data to the despreading unit $33d9$.

The despreading unit $33d9$ is configured to perform a despreading process on the uplink user data transmitted from the FEC coder unit $33d8$, and to output the data to the RF unit 34.

Figure 7:
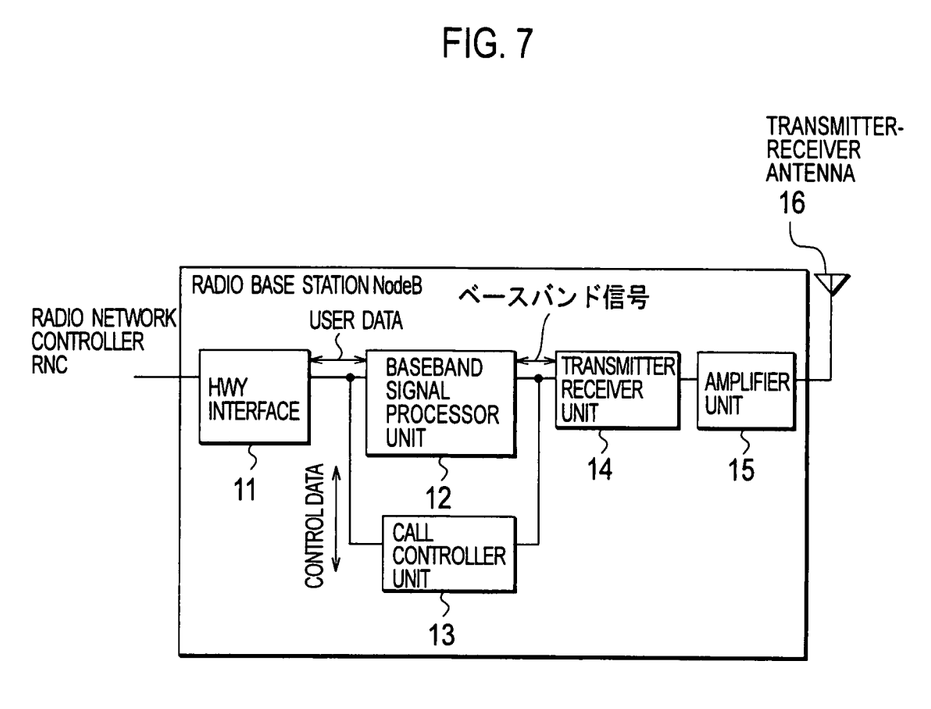
FIG. 7 is a functional block diagram of a radio base station of the mobile communication system according to the embodiment of the invention.

As shown in FIG. 7, the radio base station Node-B according to the present embodiment includes a HWY interface 11, a baseband signal processor unit 12, a call controller unit 13, one or a plurality of transmitter-receiver units 14, one or a plurality of amplifier units 15 and one or a plurality of transmitter-receiver antennas 16.

The HWY interface 11 is an interface for a radio network controller RNC. Specifically, the HWY interface 11 is configured to receive user data transmitted from a radio network controller RNC to a mobile station UE via a downlink, and to input the user data to the baseband signal processor unit 12. Moreover, the HWY interface 11 is configured to receive control data for a radio base station Node-B from a radio network controller RNC, and to input the control data to the call controller unit 13.

Furthermore, the HWY interface 11 is configured to obtain user data included in the uplink signal received from the mobile station UE via an uplink, and to transmit the user data to the radio network controller RNC. In addition, the HWY interface 11 is configured to obtain the control data for the radio network controller RNC from the call controller unit 13, and to transmit the data to the radio network controller RNC.

The baseband signal processor unit 12 is configured to perform a MAC layer process and a Layer 1 process on the user data obtained from the HWY interface 11, then to create a baseband signal, and to forward the signal to the transmitter-receiver unit 14.

Here, the MAC layer process in downlink includes a scheduling process, a transmission rate control process, or the like. In addition, the Layer 1 process in downlink includes a channel coding process, a spreading process of user data, or the like.

Moreover, the baseband signal processor unit 12 is configured to perform a MAC layer process and a Layer 1 process on the baseband signal obtained from the transmitter-receiver unit 14, then to extract user data, and to forward the user data to the HWY interface 11.

Here, the MAC layer process in uplink includes a MAC control process, a header discarding process, or the like. Moreover, the Layer 1 process in downlink includes a despreading process, a RAKE combining process, an error correction decoding process, or the like.

Note that descriptions of specific functions of the baseband signal processor unit 12 will be provided later. Furthermore, the call controller unit 13 performs a call control process, based on the control data obtained from the HWY interface 11.

The transmitter-receiver unit 14 is configured to perform a process to convert the baseband signal obtained from the baseband signal processor unit 12 into a radio frequency band signal (downlink signal), and then to transmit the signal to the amplifier unit 15. Moreover, the transmitter-receiver unit 14 is configured to perform a process to convert the radio frequency band signal (uplink signal) obtained from the amplifier unit 15 into a baseband signal, and then to transmit the signal to the baseband signal processor unit 12.

The amplifier unit 15 is configured to amplify the downlink signal obtained from the transmitter-receiver unit 14, and then to transmit the signal to a mobile station UE via the transmitter-receiver antenna 16. In addition, the amplifier unit 15 is configured to amplify the uplink signal received by the transmitter-receiver antenna 16, and then to transmit the signal to the transmitter-receiver unit 14.

Figure 8:
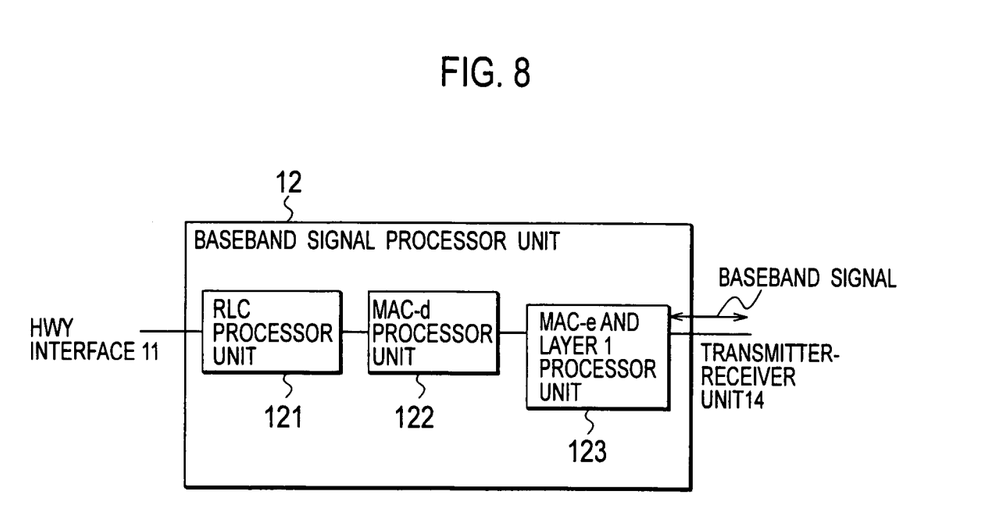
FIG. 8 is a functional block diagram of a baseband signal processor unit in a radio base station of the mobile communication system according to an embodiment of the invention.

As shown in FIG. 8, the baseband signal processor unit 12 includes an RLC processor unit 121, a MAC-d processor unit 122 and a MAC-e and Layer 1 processor unit 123.

The MAC-e and Layer 1 processor unit 123 is configured to perform a despreading process, a RAKE combining process, an HARQ process, or the like, on the baseband signal obtained from the transmitter-receiver unit 14.

The MAC-d processor unit 122 is configured to perform a header discarding process, or the like, on an output signal from the MAC-e and Layer 1 processor unit 123.

The RLC processor unit 121 is configured to perform, on the MAC-d processor unit 122, a retransmission control process, an RLC-SDU reconstruction process, or the like, in an RLC layer.

However, these functions are not explicitly separated by hardware, and can be realized by software.

Figure 9:
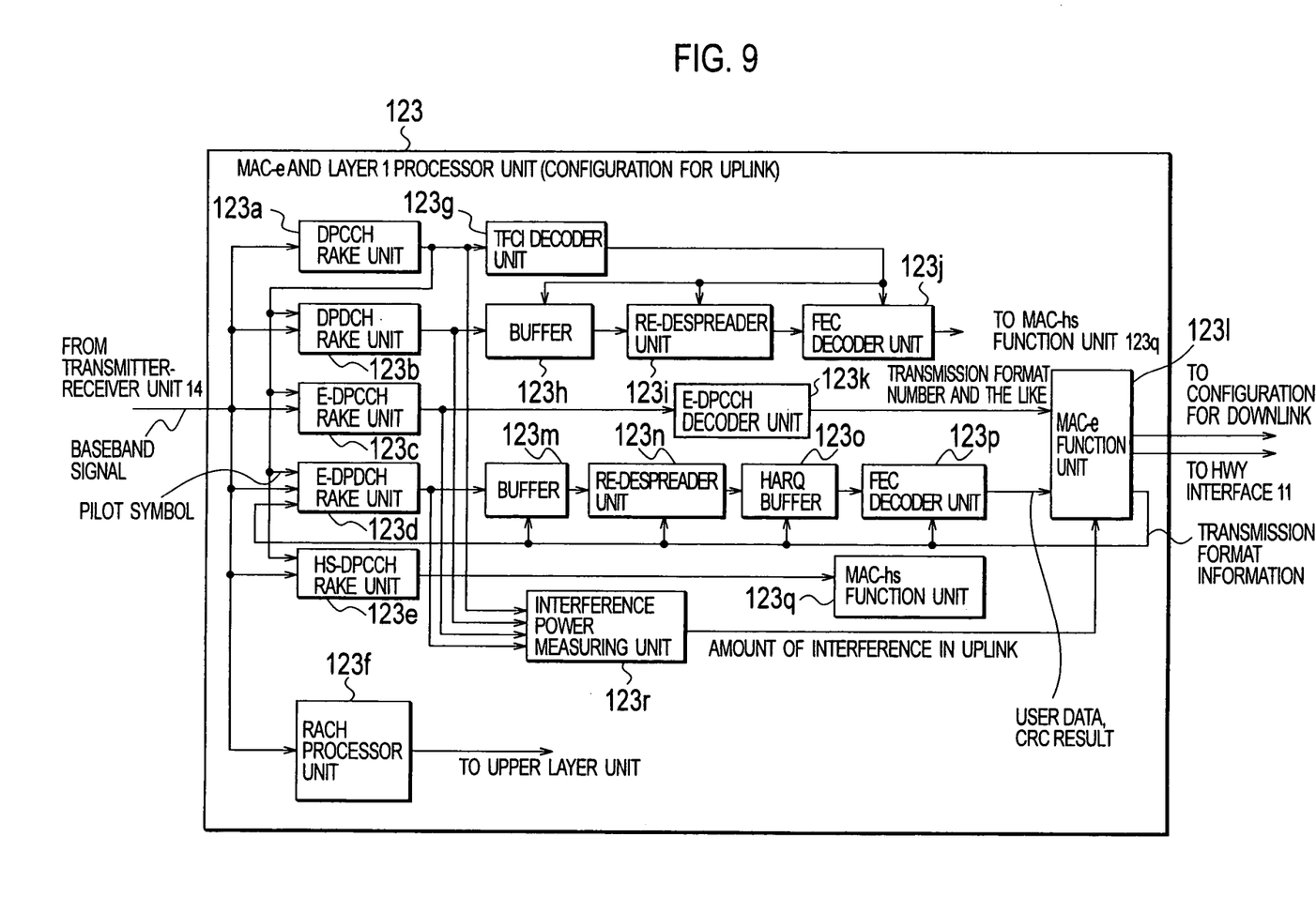
FIG. 9 is a functional block diagram of a MAC-e and Layer 1 processor unit (configuration for an uplink) in the baseband signal processor unit in a radio base station of the mobile communication system according to the embodiment of the invention.

As shown in FIG. 9, the MAC-e and Layer 1 processor unit (configuration for an uplink) 123 includes a DPCCH RAKE unit 123a, a DPDCH RAKE unit 123b, an E-DPCCH RAKE unit 123c, an E-DPDCH RAKE unit 123d, an HS-DPCCH RAKE unit 123e, an RACH processor unit 123f, a TFCI decoder unit 123g, buffers 123h and 123m, re-despreader units 123i and 123n, FEC decoder units 123j and 123p, an E-DPCCH decoder unit 123k, a MAC-e function unit 123l, an HARQ buffer 123o, a MAC-hs function unit 123q and an interference power measuring unit 123r.

The E-DPCCH RAKE unit 123c is configured to perform a despreading process and a RAKE combining process using a pilot symbol included in a dedicated physical control channel (DPCCH), on an enhanced dedicated physical control channel (E-DPCCH) in the baseband signal transmitted from the transmitter-receiver unit 14.

The E-DPCCH decoder unit 123k is configured to perform a decoding process on the RAKE combining output of the E-DPCCH RAKE unit 123c, then to obtain a transmission format number, information related to the HARQ or scheduling, or the like, and to input the obtained information to the MAC-e function unit 123l.

The E-DPDCH RAKE unit 123d is configured to perform, on the enhanced dedicated physical data channel (E-DPDCH) in the baseband signal transmitted from the transmitter-receiver unit 14, a despreading process using the transmission format information (the number of codes) transmitted from the MAC-e function unit 123l and a RAKE combining process using a pilot symbol included in the dedicated physical control channel (DPCCH).

The buffer 123m is configured to accumulate a RAKE combining output of the E-DPDCH RAKE unit 123d based on the transmission format information (the number of symbols) transmitted from the MAC-e function unit 123l.

The re-despreader unit 123n is configured to perform a despreading process, based on the transmission format information (spreading ratio) transmitted from the MAC-e function unit 123l, with respect to the RAKE combining output of the E-DPDCH RAKE unit 123d, accumulated in the buffer 123m.

The HARQ buffer 123o is configured to accumulate the output of the despreading process of the re-despreader unit 123n, based on the transmission format information transmitted from the MAC-e function unit 123l.

The FEC decoder unit 123p is configured to perform an error correction decoding process (FEC decoding process), based on the transmission format information (transmission data block size) transmitted from the MAC-e function unit 123l, with respect to the output of the despreading process of the re-despreader unit 123n, accumulated in the HARQ buffer 123o.

The interference power measuring unit 123r is configured to measure the amount of interference power in uplink (noise rise), for example, an interference power of a mobile station using its own sector as the serving cell, the entire interference power, or the like.

Here, the noise rise is a ratio of an interference power in a predetermined channel in a predetermined frequency to a noise power in the predetermined frequency (heat noise power or noise power from the outside of the mobile communication system). Specifically, the noise rise is an offset that a receiving level in a communication state has relative to a receiving level (noise floor) in a non-communication state.

The MAC-e function unit 123l is configured to calculate transmission format information (the number of codes or symbols, a spreading ratio, a transmission data block size, or the like) based on a transmission format number, information related to the HARQ or scheduling, or the like, obtained from the E-DPCCH decoder unit 123k.

Figure 10:
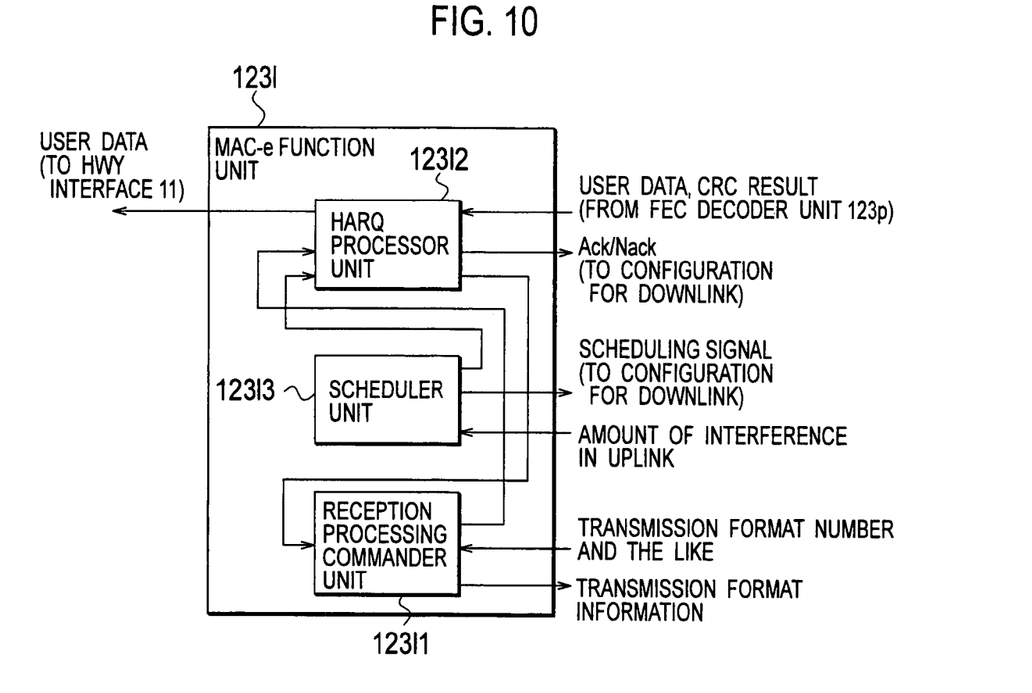
FIG. 10 is a functional block diagram of a MAC-e function unit of the MAC-e and Layer 1 processor unit (configuration for uplink) in the baseband signal processor unit in a radio base station of the mobile communication system according to the embodiment of the present invention.

In addition, the MAC-e function unit 123l includes a reception process commander unit 123l/1, an HARQ manager unit 123l/2 and a scheduling unit 123l/3, as shown in FIG. 10.

The reception process commander unit 123l/1 is configured to transmit, to the HARQ manager unit 123l/2, the transmission format number, the information related to the HARQ or scheduling, or the like, inputted from the E-DPCCH decoder unit 123*k*, or user data or the result of CRC, inputted from the FEC decoder unit 123*p*.

Moreover, the reception process commander unit 123/1 is configured to transmit, to the scheduling unit 123/3, the information related to the scheduling, inputted from the E-DPCCH decoder unit 123*k*.

Furthermore, the reception process commander unit 123/1 is configured to output transmission format information corresponding to the transmission format number inputted from the E-DPCCH decoder unit 123*k*.

The HARQ manager unit 123/2 determines, based on the result of CRC, inputted from the FEC decoder unit 123*p*, whether or not the receiving process of user data has succeeded. Then, the HARQ manager unit 123/2 creates a transmission acknowledgement signal (Ack or Nack) based on the determination result, and transmits the signal to the configuration for downlink of the baseband signal processor unit 12. In addition, the HARQ manager unit 123/2 transmits, to the radio network controller RNC, the uplink user data inputted from the FEC decoder unit 123*p* in a case where the determination result is OK.

Furthermore, in the case where the aforementioned determination result is OK, the HARQ manager unit 123/2 clears soft determination information accumulated in the HARQ buffer 123*o*. On the other hand, in a case where the aforementioned determination result is NG, the HARQ manager unit 123/2 accumulates the uplink user data in the HARQ buffer 123*o*.

In addition, the HARQ manager unit 123/2 forwards the aforementioned determination result to the reception process commander unit 123/1. Based on the received determination result, the reception process commander unit 123/1 notifies the E-DPDCH RAKE unit 123*d* and the buffer 123*m* of hardware resources to be prepared for the next TT1.

Moreover, the receiving process commander unit 123/1 issues a notification to the HARQ manager unit 123/2 for securing the resources of the HARQ buffer 123*o*.

Furthermore, in a case where there are user data accumulated in the buffer 123*m* with respect to the buffer 123*m* and the FEC decoder unit 123*p* for each TTI, the reception process commander unit 123/1 instructs the HARQ buffer 123*o* and the FEC decoder unit 123*p* to perform an EFD decoding process after the uplink user data which are in a process applicable to the TTI accumulated in the HARQ buffer 123*o*, and newly received uplink user data are added.

Moreover, the scheduling unit 123/3 instructs the configuration for downlink of the baseband signal processor unit 12 to notify a scheduling signal including the maximum allowable transmission rate (the maximum allowable transmission data block size, the maximum allowable transmission power ratio, or the like), or a parameter related to the maximum allowable transmission rate, based on the radio resources in the uplink of the radio base station Node-B, or the amount of interference (noise rise) in uplink, or the like.

Specifically, the scheduling unit 123/3 is configured to determine the maximum allowable transmission rate (or the parameter related to the maximum allowable transmission rate) based on the information related to the scheduling, transmitted from the E-DPCCH decoder unit 123*k*, or the amount of interference in uplink, transmitted from the interference power measuring unit 123*r*, and to control user transmission rate of a mobile station in communications.

Hereinafter, descriptions will be specifically given of a control method based on hardware resources and of a control method based on the amount of interference in uplink.

In the control method based on hardware resources, the scheduling unit 123/3 is configured to broadcast the maximum allowable transmission rate (or the parameter related to the maximum allowable transmission rate) by an absolute rate grant channel (AGCH) to mobile stations connected to a sector under the scheduling unit 123/3.

In a case where the transmission rate of user data of a mobile station connected to the sector under the scheduling unit 123/3 increases, and where hardware resources are about to run out, the scheduling unit 123/3 sets the maximum allowable transmission rate (or the parameter related to the maximum allowable transmission rate) low, and avoids the occurrence of a lack of hardware resources.

On the other hand, in a case where the transmission of user data of a mobile station connected to the sector under the scheduling unit 123/3 ends or the like, and where there are some extra hardware resources, the scheduling unit 123/3 again sets the maximum allowable transmission rate (or the parameter related to the maximum allowable transmission rate) high.

Moreover, in the control method based on the amount of interference in uplink, the scheduling unit 123/3 is configured to broadcast the maximum allowable transmission rate (or the parameter related to the maximum allowable transmission rate) by an absolute rate grant channel (AGCH) to mobile stations connected to a sector under the scheduling unit 123/3.

In a case where the transmission rate of user data of a mobile station connected under the scheduling unit 123/3 increases, and then, the amount of interference (for example, noise rise) in uplink exceeds an allowable value (for example, the maximum allowable noise rise), the scheduling unit 123/3 sets the maximum allowable transmission rate (or the parameter related to the maximum allowable transmission rate) low and keeps the amount of interference in uplink within the allowable value (refer to FIG. 3).

On the other hand, in a case where the amount of interference is kept within the allowable value (for example, the maximum allowable noise rise), and thus there is some margin because the transmission of user data of a mobile station connected to the sector under the scheduling unit 123/3 ends or the like, the scheduling unit 123/3 sets again the maximum allowable transmission rate (or the parameter related to the maximum allowable transmission rate) high (refer FIG. 3).

Note that in a case where the Autonomous ramping method is used, the scheduling unit 123/3 is configured not to transmit a relative rate grant channel to a mobile station unconnected to a sector under the scheduling unit 123/3.

Moreover, the scheduling unit 123/3 notifies the HARQ manager 123/2 of the scheduling signal. In addition, the reception process commander unit 123/1 as well notifies, for preparing the receiving process of user data in the next TTI, the HARQ manager unit 123/2 of the transmission format number decoded by the E-DPCCH decoder unit 123*k*.

The radio network controller RNC according to the present embodiment is a device positioned at an upper layer of a radio base station Node-B, and is configured to control radio communications between the radio base station Node-B and a mobile station UE.

Figure 11:
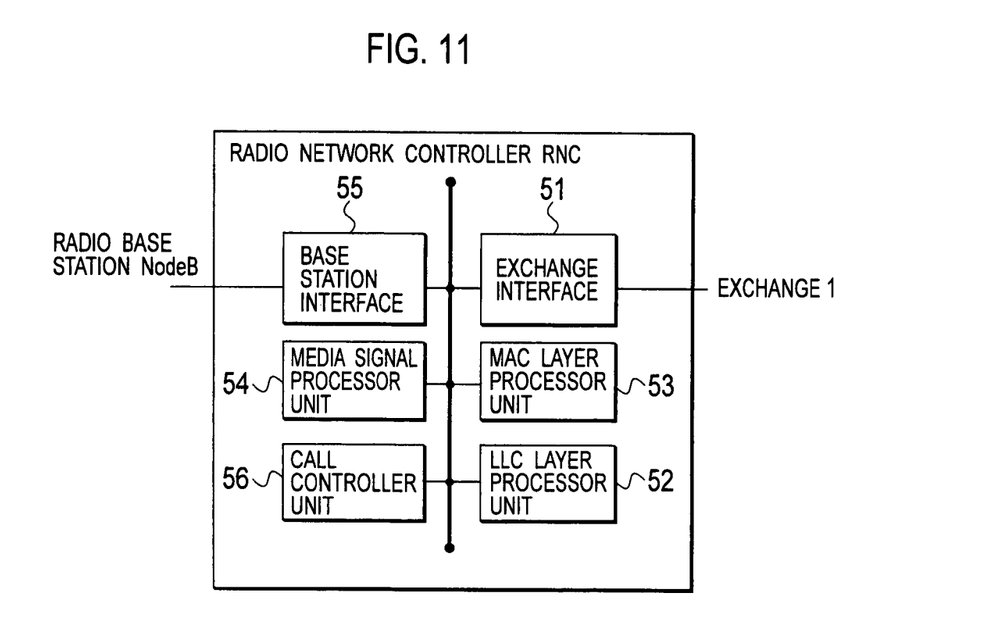
FIG. 11 is a functional block diagram of a radio network controller of the mobile communication system according to the embodiment of the present invention.

As shown in FIG. 11, the radio network controller RNC according to the present embodiment includes an exchange interface 51, an LLC layer processor unit 52, a MAC layer processor unit 53, a media signal processor unit 54, a base station interface 55 and a call controller unit 56.

The exchange interface 51 is an interface for an exchange 1. The exchange interface 51 is configured to forward, to the LLC layer processor unit 52, a downlink signal transmitted from the exchange 1, and also to forward, to the exchange 1, an uplink signal transmitted from the LLC layer processor unit 52.

The LLC layer processor unit 52 is configured to perform a LLC (Logical Link Control) sub layer process such as a combining process of a header of or a trailer of a sequence number, or the like. The LLC layer processor unit 52 is configured to transmit an uplink signal to the exchange interface 51 after performing the LLC sub layer process, and to transmit a downlink signal to the MAC layer processor unit 53.

The MAC layer processor unit 53 is configured to perform a MAC process such as a priority control process, a header addition process, or the like. The MAC layer processor unit 53 is configured to transmit an uplink signal to the LLC layer processor unit 52, and to transmit a downlink signal to the base station interface 55 (or the media signal processor unit 54).

The media signal processor unit 54 is configured to perform a media signal process on audio signals or real-time video signals. The media signal processor unit 54 is configured to transmit an uplink signal to the MAC layer processor unit 53 after performing the media signal process, and to transmit a downlink signal to the base station interface 55.

The base station interface 55 is an interface for the radio base station Node-B. The base station interface 55 is configured to forward the uplink signal transmitted from the radio base station Node-B, to the MAC layer processor unit 53 (or the media signal processor unit 54), and to forward the downlink signal transmitted from the MAC layer processor unit 53 (or the media signal processor unit 54), to the radio base station Node-B.

The call processor unit 56 is configured to perform a call acceptance control process or a channel setting and releasing process by Layer 3 signaling, or the like.

In a case where the Autonomous ramping method is used, the call controller unit 56 instructs a non-serving cell not to transmit a relative rate grant channel for adjusting the aforementioned maximum allowable transmission rate by the relative rate grant channel.

Operation of Mobile Communication System According to First Embodiment of the Present Invention While referring to FIGS. 12 and 13, a description will be given of an operation in which a channel is set between a mobile station UE and a non-serving cell #6 in the mobile communication system according to the first embodiment of the present invention.

Figure 12:
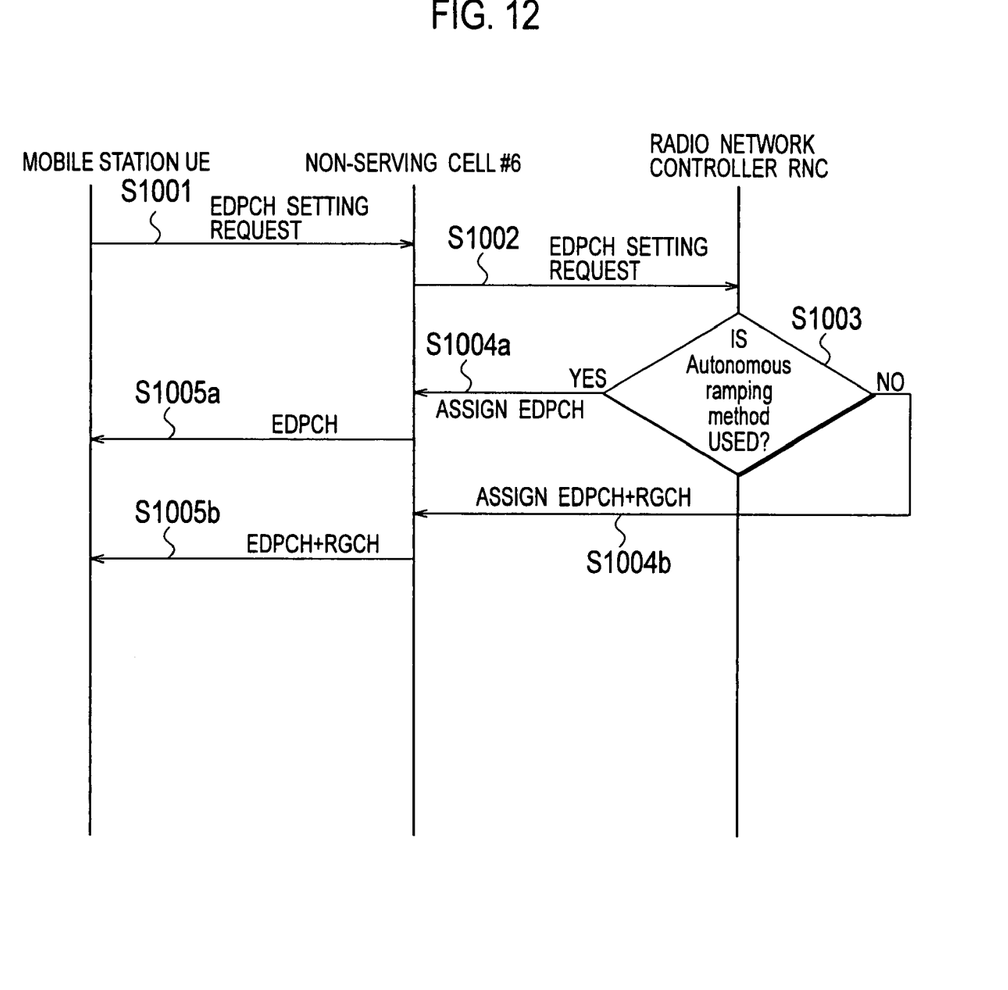
FIG. 12 is a sequence diagram showing an operation of the mobile communication system according to the embodiment of the present invention.

As shown in FIG. 12, in step S1001, the mobile station UE transmits, to the non-serving cell #6, an E-DCH setting request for requesting an enhanced dedicated physical channel (E-DPCH) setting.

In step S1002, the non-serving cell #6 forwards the received E-DCH setting request to a radio network controller RNC.

In step S1003, the radio network controller RNC determines whether or not the Autonomous ramping method is used in the mobile communication system.

Specifically, the radio network controller RNC determines whether or not a serving cell that performs scheduling control in the uplink of the mobile station UE has transmitted an absolute rate grant channel for instructing the maximum allowable transmission rate (Secondary Absolute rate grant) common to the serving cell to the mobile station UE, and the mobile station UE is configured to determine the transmission rate of user data to be transmitted via the uplink (E-DPCH) based on the absolute rate grant channel.

In a case where it is determined that the Autonomous ramping method is used, in step S1004, the radio network controller RNC grants an enhanced dedicated physical channel (E-DPCH) (without granting a relative rate grant channel (RGCH)). In step S1005a, the radio network controller RNC notifies the mobile station UE of a channelization code related to the granted enhanced dedicated physical channel (E-DPCH), or the like, via the non-serving cell #6.

On the other hand, in a case where it is determined that the Autonomous ramping method is not used, the radio network controller RNC grants an enhanced dedicated physical channel (E-DPCH) and a relative rate grant channel (RGCH) in step S1004b. In step S1005b, the radio network controller RNC notifies, via the non-serving cell #6, the mobile station UE of a channelization code related to the granted channel, or the like.

Figure 13:
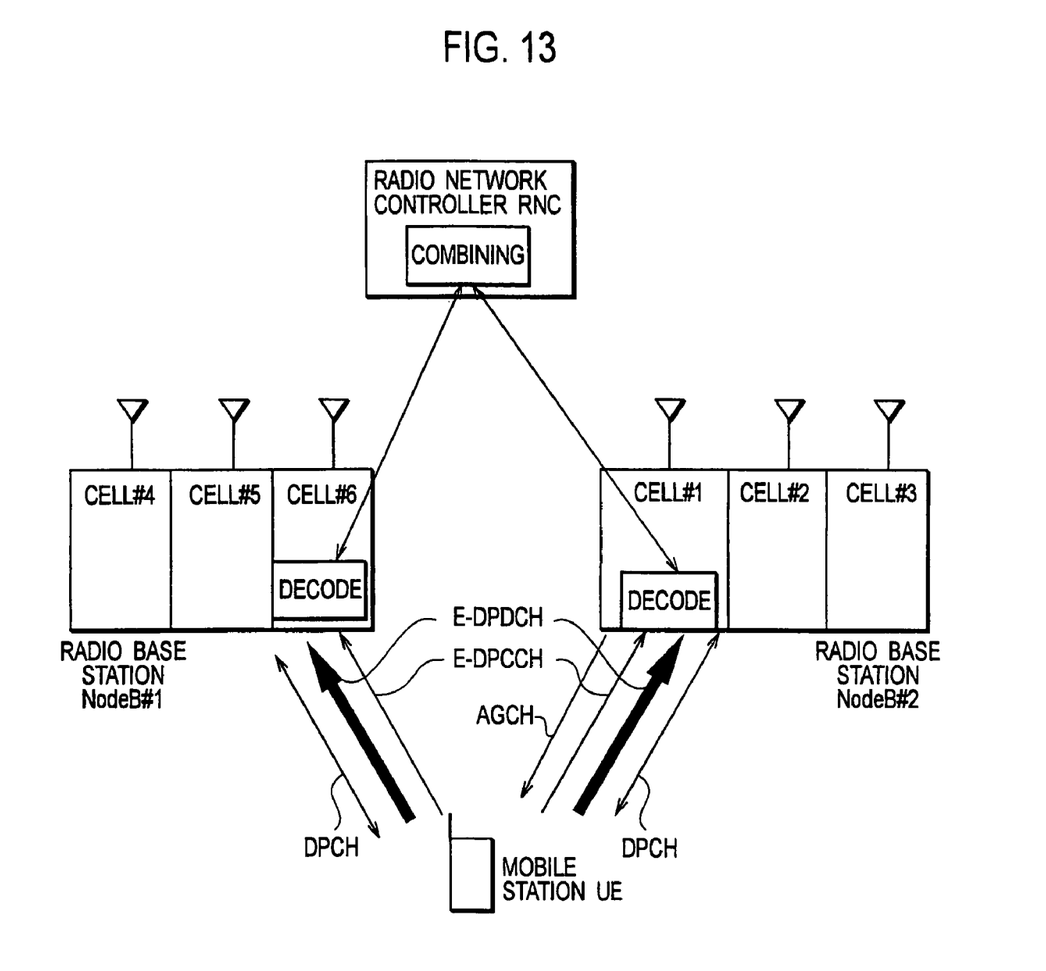
FIG. 13 is a diagram showing an example of a channel configuration in a case where the Autonomous ramping is used in the mobile communication system according to the embodiment of the present invention.

Note that a channel configuration of a case where the Autonomous ramping method is used in the mobile communication system according to the present embodiment is shown in FIG. 13.

Effect and Advantage of Mobile Communication System According to First Embodiment of the Present Invention According to the mobile communication system in the case of the first embodiment of the present invention, since it is configured not to transmit a relative rate grant channel when the Autonomous ramping method is used, the radio capacity can be increased by saving radio resources of the downlink in a mobile communication system using the Autonomous ramping method.

INDUSTRIAL APPLICABILITY

As described above, according to the present invention, it is possible to provide a transmission rate control method, a mobile station, a radio base station and a radio network controller that make it possible to increase a radio capacity by saving radio resources in a downlink in a mobile communication system using the Autonomous ramping method.

The invention claimed is:

1. A transmission rate control method of controlling a transmission rate of user data to be transmitted from a mobile station via an uplink, used in a communication system in which an absolute rate grant channel for designating a maximum allowable transmission rate and a relative rate grant channel for adjusting the maximum allowable transmission rate are to be transmitted from a serving cell, and the relative rate grant channel is to be transmitted from a non serving cell, wherein when the serving cell performing a scheduling control in the uplink of the mobile station transmits, to the mobile station, the absolute rate grant channel for designating the maximum allowable transmission rate common in the serving cell, and the mobile station determines the transmission rate of the user data based on the absolute rate grant channel provided by the serving cell, the non-serving cell does not transmit the relative rate grant channel.

2. A radio base station capable of communicating with a mobile station configured to control a transmission rate of user data to be transmitted via an uplink, used in a communication system in which an absolute rate grant channel for designating a maximum allowable transmission rate and a relative rate grant channel for adjusting the maximum allowable transmission rate are to be transmitted from a serving cell, and the relative rate grant channel is to be transmitted from a non serving cell, wherein when the serving cell performing a scheduling control in the uplink of the mobile station transmits, to the mobile station, the absolute rate grant channel for designating the maximum allowable transmission rate common in the serving cell, the mobile station determines the transmission rate of the user data based on the absolute rate grant channel provided by the serving cell, the radio base station serves as the non-serving cell is configured not to transmit, to the mobile station, the relative rate grant channel.

3. A radio network controller configured to control a transmission rate of user data to be transmitted from a mobile station via an uplink, used in a communication system in which an absolute rate grant channel for designating a maximum allowable transmission rate and a relative rate grant channel for adjusting the maximum allowable transmission rate are to be transmitted from a serving cell, and the relative rate grant channel is to be transmitted from a non serving cell, wherein when the serving cell performing a scheduling control in the uplink of the mobile station transmits, to the mobile station, the absolute rate grant channel for designating the maximum allowable transmission rate common in the serving cell, and the mobile station determines the transmission rate of the user data based on the absolute rate grant channel, the radio network controller is configured to make the non-serving cell in not to transmit the relative rate grant channel.

* * * * *